March 20, 1956  P. E. CLINGMAN ET AL  2,738,826
FIXTURE FOR VULCANIZING RUBBER SECTIONS Filed Sept. 18, 1952  2 Sheets-Sheet 1

INVENTORS
PAUL E. CLINGMAN &
LEO C. HEIMGARTNER

THEIR ATTORNEYS

March 20, 1956     P. E. CLINGMAN ET AL     2,738,826
FIXTURE FOR VULCANIZING RUBBER SECTIONS
Filed Sept. 18, 1952     2 Sheets-Sheet 2

INVENTORS
PAUL E. CLINGMAN &
LEO C. HEIMGARTNER

THEIR ATTORNEYS

United States Patent Office 2,738,826
Patented Mar. 20, 1956

2,738,826

FIXTURE FOR VULCANIZING RUBBER SECTIONS

Paul E. Clingman and Leo C. Heimgartner, Dayton, Ohio, assignors to General Motors Corporation, Detroit, Mich., a corporation of Delaware Application September 18, 1952, Serial No. 310,328

2 Claims. (Cl. 154—42)

This invention deals with a method of integrally joining rubber sections, and a fixture for butt vulcanizing and perfecting the original cross-sectional contour of a rubber strip. The ends of the sections to be joined are coated with rubber cement and assembled in an end-to-end relation upon a supporting rail. The rail has one or more aligning flanges receptive of channels in the rubber sections, and additional contour strips are placed in other grooves and channels of the rubber sections, each extending part way along the grooves or the channels in both of the abutted rubber sections. A flexible metal band is then clamped around the rails, aligning bars, and the ends of the rubber sections in order to compress the rubber sections against the rail and aligner strips and in order to maintain the cross-sectional contour of the rubber sections while vulcanizing. A releasable clamp means secures the flexible band and adjusts the pressure upon the parts, and has provisions for attaching to a conveyor, whereby the assembly of rubber sections and fixture may be conveyed through a chamber heated by infra-red lamps for vulcanization of the joint.

Further objects and advantages of the present invention will be apparent from the following description, reference being had to the accompanying drawings wherein a preferred embodiment of the present invention is clearly shown.

Figure 4:
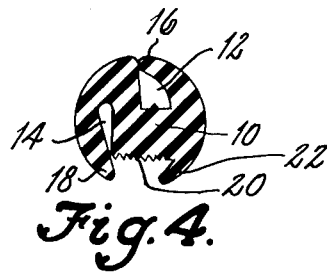
Fig. 4 is a cross sectional view of a rubber section substantially indicated by the line and arrows 4—4 of Fig. 1.

Referring to the drawings, and first with respect to Fig. 4, it has been difficult heretofore to join rubber sections of irregular contour so that all irregularities with respect to one section would be properly aligned with like or identical elements of the other rubber section. That is particularly so with respect to pliable rubber sealing strips, for weather seals, having grooves and channels for mounting and sealing structural elements such as glass windshield and thin metal body structures where it is essential to perfect and maintain weathertight joints. One such weatherstrip to be joined has a cross sectional contour illustrated for example in Fig. 4, in which a main body portion 10 of pliable rubber provides a glass channel 12 and a body channel 14 with adjacent lips 16 or 18 as well as a base portion 20 joining a rib or flange 22.

Heretofore it has been the practice to arrange the end portions of such rubber sections in generally aligned but spaced relation so that an injection of uncured rubber could be inserted between the adjacent end sections which is then vulcanized and cured.

Figure 1:
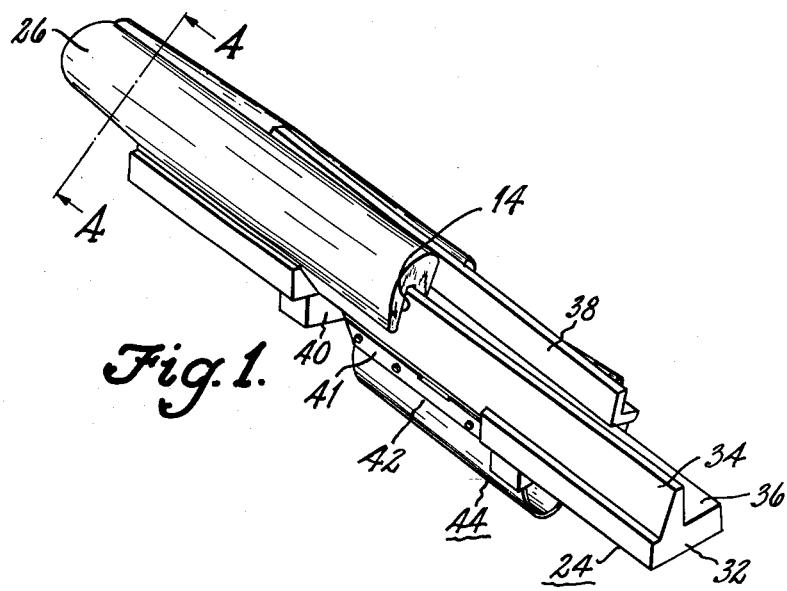
Fig. 1 is a perspective view of a fixture for use in the method of joining two flexible rubber sections with one portion of the sections to be joined in position thereon.

That method is cumbersome, difficult to obtain and requires complicated mold fixtures, somewhat as illustrated in application, Ser. No. 156,624. As illustrated in Fig. 1, a fixture 24 is provided for supporting rubber sections 26 and 28 with their ends in abutting relation at 30 in Fig. 2. A support rail 32 has a flange 34 to fill the channel 14 of the rubber section, and is joined by flat portion 36 engageable with the base portion 20 of the strip. An aligner strip 38 is contoured to fill the channel 12 of the rubber section. Upon these parts of the fixture one end of a rubber section 26 is assembled and so adjusted that about half the length of the flange 34 and aligner strip 38 extend within the grooves or channels of the rubber section 26 while the other half is disposed in the grooves and channels of the other section 28 somewhat as illustrtaed in Fig. 2 where the ends of sections 26 and 28 abut one another as indicated at 30. Before being assembled the ends of the rubber sections 26 and 28 are coated with rubber cement which is to be vulcanized for making an integral joint between the sections.

Figure 2:
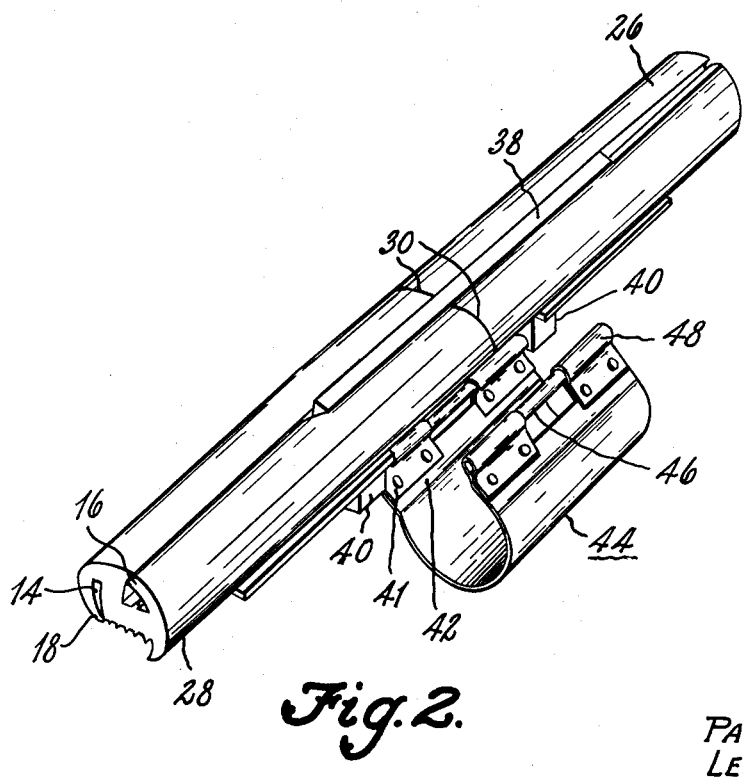
Fig. 2 is a perspective view illustrating another step in the method of joining rubber sections with both sections to be joined assembled thereon.
Figure 3:
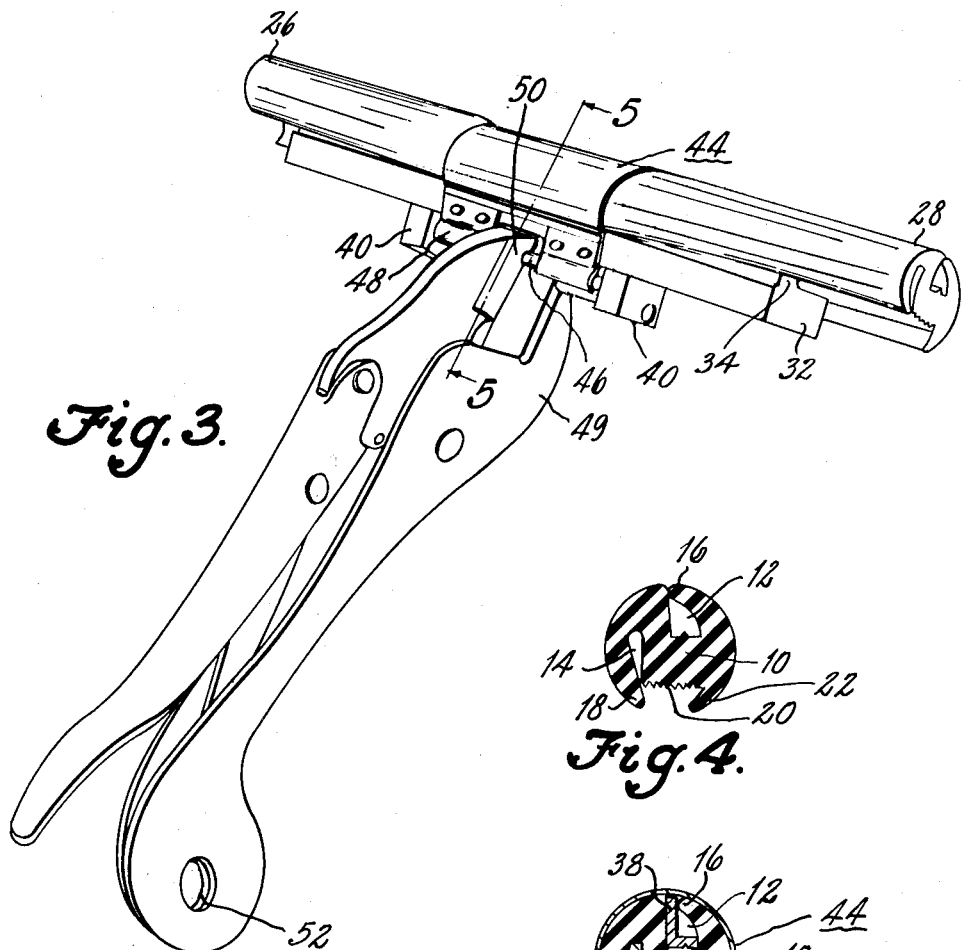
Fig. 3 is a perspective view of the fixture and rubber section in clamped position.
Figure 5:
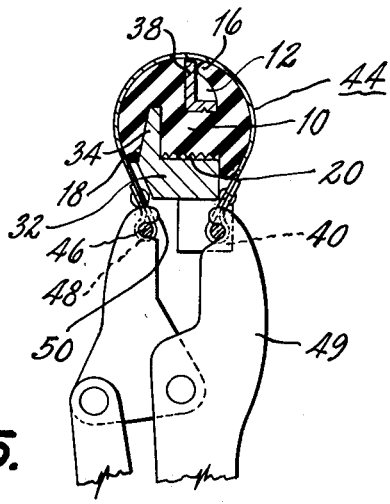
Fig. 5 is a cross sectional view substantially as indicated by the line and arrows 5—5 of Fig. 3.

Secured to the rail 32 there are a pair of hinge blocks 40 to which is pivotally connected at 41 one end 42 of a flexible metal band 44 providing at its other end a hinge pin 46 secured in loops 48. When the parts have been assembled as shown in Fig. 2 the flexible band 44 is wrapped around the assembly of rubber sections, flange 34 and aligner 38, which disposes the parts substantially as shown in Fig. 5. A clamp device 49 secured to the anchor pin 41 and having a part 50 engageable over the hinge pin 46 is adapted to compress the embraced portions of the rubber sections and force the rubber thereof in close contact with all surfaces of the contour perfecting means of the support rail 32 and aligner 38. Some degree of compression of rubber sections 26 and 28 can be observed in Fig. 3, where parts are shown with a clamp band in place and held in compressed relation by the clamp, which has an apertured ear 52 or like device, for attachment to a conveyor system. In following this method of vulcanization the clamp and fixture with the assembled parts of the rubber section is conducted through a heating chamber, where infra red lamps or other heating devices provide for vulcanization of the joint as the fixture is moved through the chamber.

Where reference has been made to rubber sections it is to be understood that the term is intended to identify not only individual rubber units, but is also used to identify the opposite ends of an extruded rubber strip, which when brought in to alignment and when joined by this process, provide an endless ring or like member suitable for surrounding a sheet of glass or like material and used as a windshield mounting and sealing member.

The use of vulcanizable cements from rubber-like materials on the joint faces of the vulcanized rubber-like material is arbitrary and facilitates the joining of the rubber sections. It is found that any vulcanizable cement from rubber-like material is satisfactory, although I prefer a crude rubber cement.

While the embodiment of the present invention as herein disclosed, constitutes a preferred form, it is to be understood that other forms might be adopted.

What is claimed is as follows:

1. A fixture for holding and vulcanizing abutting ends of two rubber strip-like sections having externally located longitudinal grooves and channels therein, comprising in combinations, a rail for supporting an end of both rubber sections, means connected to said rail and contoured and disposed to be insertable in one of said channels, aligner strips disposed and contoured for being inserted in remaining channels of the rubber strips, a metal band hingedly connected to the rail and sufficiently flexible for being wrapped around the assembly to enclose the ends of the rubber strips and the aligner strips, and a clamp member for tightening and holding the metal band around the assemblies for compressing said rubber sections and having means on said clamp member for mounting on a conveyor for transporting the assembly through a heating chamber.

2. In a method for forming a joint between the ends of two flexible rubber-like strips each having at least one longitudinal groove extending along an outer surface thereof, the steps comprising; coating the ends of said strips with a vulcanizable rubber cement, inserting a support in the grooves of each of said strips for aligning said strips, maintaining the ends of said strips in axial alignment when said ends are brought into abutting relation with each other on said support, compressing the material of said strips against said support, and maintaining said strips under compression while maintaining the contour of said grooves on said support, heating said cement and vulcanizing the same to form an integral joint between said strip ends.

References Cited in the file of this patent

UNITED STATES PATENTS

| | | |
|---|---|---|
| 2,259,256 | Mass et al. | Oct. 14, 1941 |
| 2,402,631 | Hull | June 21, 1946 |
| 2,574,169 | Brown | Nov. 6, 1951 |